(12) United States Patent
Hasegawa et al.

(10) Patent No.: US 7,263,427 B2
(45) Date of Patent: Aug. 28, 2007

(54) FAILURE DIAGNOSTIC METHOD AND APPARATUS FOR MANIFOLD PRESSURE SENSORS

(75) Inventors: Shumpei Hasegawa, Saitama (JP); Takashi Sasaki, Saitama (JP); Haruo Nakayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 11/352,374

(22) Filed: Feb. 13, 2006

(65) Prior Publication Data

US 2006/0184308 A1    Aug. 17, 2006

(30) Foreign Application Priority Data

Feb. 15, 2005  (JP)  ............... 2005-037573

(51) Int. Cl.
  *B60T 7/12*   (2006.01)
  *G01L 23/22*  (2006.01)
(52) U.S. Cl. ............ 701/107; 73/35.01; 73/118.1; 701/114
(58) Field of Classification Search ........ 701/101, 701/107, 114; 73/35.01, 35.12, 117.3, 118.1, 73/118.2
  See application file for complete search history.

(56) References Cited

U.S. PATENT DOCUMENTS 7,051,689 B2*  5/2006  Tamura et al. .......... 123/90.15
7,100,571 B1*  9/2006  Hasegawa ............... 123/399
7,203,594 B2*  4/2007  Hasegawa ............... 701/114
2006/0184309 A1*  8/2006  Hasegawa ............... 701/114
2006/0184310 A1*  8/2006  Hasegawa ............... 701/114

FOREIGN PATENT DOCUMENTS

JP    10-176582 A    6/1998
JP    2003-307152 A  10/2003

* cited by examiner

*Primary Examiner*—John T. Kwon
(74) *Attorney, Agent, or Firm*—Birch, Stewart, Kolasch & Birch, LLP

(57) ABSTRACT

A failed manifold pressure sensor is identified in a control apparatus having two manifold pressure detecting systems as a failsafe. A first comparing unit outputs an abnormal signal when a difference ΔP between manifold pressures PMa and PMb detected respectively by two sensors is larger than a threshold value DP. A manifold pressure estimating unit estimates the manifold pressure from the engine revolution Ne, a throttle opening PLP, and an atmospheric pressure PAa. The difference calculating unit calculates a difference ΔPMb between the detected manifold pressure PMb and the estimated manifold pressure PMcal. The difference calculating unit calculates a difference ΔPMa between the detected manifold pressure PMa and the estimated manifold pressure PMcal. A second comparing unit compares the difference ΔPMa and the difference ΔPMb in response to the aforementioned abnormal signal. The failed manifold pressure sensor is specified according to which one of the difference ΔPMa and the difference ΔPMb is larger.

17 Claims, 6 Drawing Sheets

FAILURE DIAGNOSTIC METHOD AND APPARATUS FOR MANIFOLD PRESSURE SENSORS

CROSS-REFERENCE TO RELATED APPLICATIONS

This nonprovisional application claims priority under 35 U.S.C. § 119(a) on patent application Ser. No. 2005-037573, filed in Japan on Feb. 15, 2005, the entirety of which is incorporated herein by reference.

BACKGROUND OF THE INVENTION

1. Field of the Invention

The present invention relates to a failure diagnostic apparatus for manifold pressure sensors used in an engine control system and, more specifically, to a failure diagnostic method and apparatus for manifold pressure sensors in a system having a first manifold pressure sensor and a second manifold pressure sensor that backs up the first manifold pressure sensor.

2. Description of Background Art

A number of sensors have been used in engine control and failure diagnostic systems for diagnosing whether or not these sensors are normal. For example, Japanese Patent Application Laid-Open No. 2003-307152 discloses a method that includes a step of determining whether or not an output signal of a sensor that senses pressure in an intake manifold is within a preset range, a step of calculating the pressure in the intake manifold on the basis of engine operating conditions, and a step of determining whether or not a difference between the pressure in the intake manifold indicated by the output signal from the sensor and the calculated pressure in the intake manifold is smaller than a set value when the output signal from the sensor is within the range. However, when the output signal from the sensor is not within the range or when the difference is not smaller than the set value, the calculated pressure is set as the pressure in the intake manifold.

In an electronically controlled throttle apparatus disclosed in Japanese Patent Application Laid-Open No. 10-176582, two systems each include an accelerator sensor, a throttle sensor, etc. are provided as a failsafe device or the like. Failure diagnosis is performed by comparing sensor outputs of the two systems. For example, it is determined whether or not the throttle sensor has failed, by comparing a deviation between a main throttle sensor and a sub throttle sensor and a predetermined threshold value.

Failures of a sensor system such as a disconnection and/or a short circuit can be determined when a sensor output value is too high or too low with respect to a predetermined value or a predetermined range. The failures can be addressed in a predetermined manner, depending on the type of failure. However, it is possible that a change or deterioration of output characteristics may impair normal control, even though the sensor output value is within a predetermined range. Therefore, it is not possible to determine that a failure has occurred.

The diagnostic method disclosed in Japanese Patent Application Laid-Open No. 10-176582 can detect that either one of the two system sensors has a failure. However, it is difficult to determine which one of those has the failure.

SUMMARY OF THE INVENTION

It is an object of an embodiment of the present invention to provide a failure diagnostic method and apparatus for manifold pressure sensors, which can reliably detect which manifold pressure sensor has a failure in a system having two manifold pressure sensors.

In order to achieve the above-described object, an embodiment of the present invention is directed to a failure diagnostic method for manifold pressure sensors that are used in an engine control system. The engine control system includes a first manifold pressure sensor that performs main control, a second manifold pressure sensor that backs up the first manifold pressure sensor, an atmospheric pressure sensor, an engine revolution detecting means, and a throttle sensor. The failure diagnostic method includes the steps of calculating an estimated manifold pressure on the basis of the engine revolution, a throttle opening, and an atmospheric pressure value, determining that an abnormality has occurred when a difference between an output from the first manifold pressure sensor and an output from the second manifold pressure sensor exceeds a predetermined range, and specifying a sensor out of the first and second manifold pressure sensors in which a difference between the output and the estimated manifold pressure is larger as a failed sensor when it has been determined that an abnormality has occurred.

Another embodiment of the present invention is directed to a failure diagnostic apparatus for manifold pressure sensors used in an engine control system. The engine control system has a first manifold pressure sensor that performs main control, a second manifold pressure sensor that backs up the first manifold pressure sensor, an atmospheric pressure sensor, an engine revolution detector, and a throttle sensor. An abnormality recognizing unit outputs an abnormal signal when a difference between a first detected manifold pressure value detected by the first manifold pressure sensor and a second detected manifold pressure value detected by the second manifold pressure sensor exceeds a threshold value. A manifold pressure estimating unit outputs an estimated manifold pressure value in response to input of the engine revolution, a throttle opening, and an atmospheric pressure value according to a predetermined mutual relationship among the engine revolution, the throttle opening, a manifold pressure, and an atmospheric pressure. An abnormality identifying unit calculates difference between the first detected manifold pressure value and the second detected manifold pressure value with respect to the estimated manifold pressure value, respectively. The abnormality identifying unit also identifies the manifold pressure sensor that detected a manifold pressure value having a calculated difference that is larger as a failed sensor. The identification of the failed sensor by the abnormality identifying unit is performed in response to an output of the abnormal signal from the abnormality recognizing unit.

According to a further embodiment of the present invention, determinations of differences by the abnormality recognizing unit and the abnormality identifying unit are performed using absolute values of the differences.

According to a further embodiment of the present invention, an abnormality recognizing unit outputs an abnormal signal when a ratio value between a first detected manifold pressure value detected by the first manifold pressure sensor and a second detected manifold pressure value detected by the second manifold pressure sensor is deviated from a threshold value. In addition, a manifold pressure estimating unit outputs an estimated manifold pressure value in response to input of the engine revolution, a throttle opening, and an atmospheric pressure value according to a predetermined mutual relationship among the engine revolution, the throttle opening, a manifold pressure, and an atmospheric pressure. Furthermore, an abnormality identifying unit calculates a ratio value between the estimated manifold pressure value and the first detected manifold pressure value, and a ratio value between the exterminated manifold pressure value and the second detected manifold pressure value. The abnormality identifying unit identifies the manifold pressure sensor that detected the manifold pressure value corresponding to the calculated ratio value which is deviated more from a predetermined value as a failed sensor. The identification of the failed sensor by the abnormality identifying unit is performed in response to an output of the abnormal signal from the abnormality recognizing unit.

According to the present invention, at least one of the first and second manifold pressure sensors is identified as having failed when the difference between the outputs of the first and second manifold pressure sensors is large. Specifically, when the abnormality is determined, the differences between the pressures detected by the first and second manifold pressure sensors and the estimated manifold pressure value calculated on the basis of the engine revolution, the throttle opening, and the atmospheric pressure value are calculated. The manifold pressure sensor which has detected a pressure corresponding to the larger difference (or a ratio value that deviates more from the predetermined value) can be determined as a failed pressure sensor.

Therefore, in the present invention, abnormalities can be detected that cannot be detected by the failure detecting unit in the background art, which determines that an abnormality has occurred in one of the sensors only from the fact that the output of the sensor is simply deviated from the predetermined range. For example, in the present invention, a sensor having a lowered function due to deterioration can be detected.

Accordingly, in the engine control system having two manifold pressure detection systems as a failsafe when one of the detection systems has failed, the other detection system can back it up. In addition, it can be determined whether both of the manifold pressure detection systems are normal or have failed. Furthermore, based on this determination, a compensating operation that is required to the control system can be enabled. The compensating operation includes the usage of a substitute value or switching to a backup system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
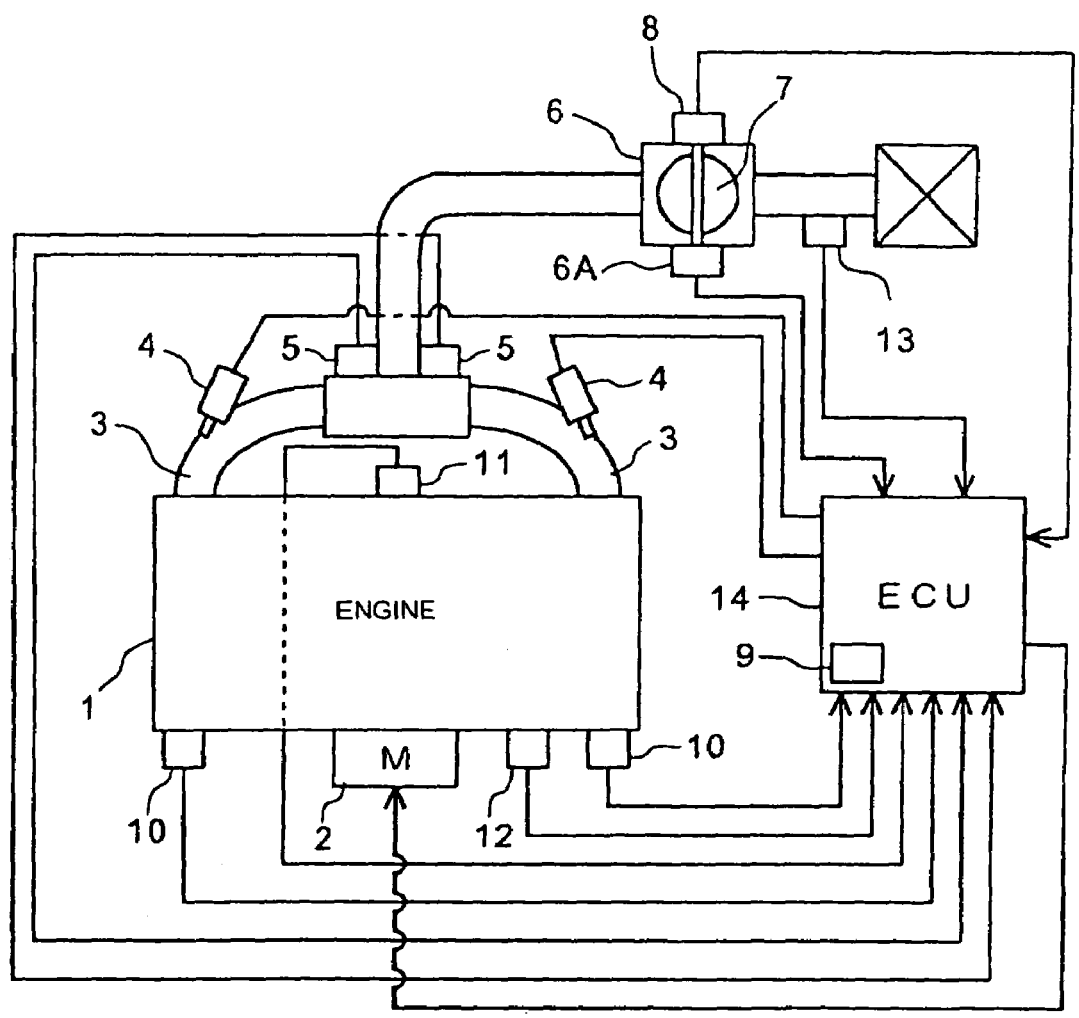
FIG. 2 is a general drawing showing an engine control system including the diagnostic apparatus according to the embodiment of the present invention.

Referring now to the drawings, an embodiment of the invention will be described. FIG. 2 is a block diagram of a principal portion of an engine including a failure diagnostic apparatus. In FIG. 2, an engine 1 is a reciprocal internal combustion engine for an airplane, and is provided with a starter motor 2 for activation. Although components for two cylinders are shown in FIG. 2, the number of cylinders in the engine 1 is not limited. An intake manifold 3 of the engine 1 is provided with fuel injection valves 4 and manifold pressure sensors 5 on an upstream side of the fuel injection valve 4 for detecting pressure in the intake manifold 3. Two manifold pressure sensors 5 are provided on each of the cylinders for main control and for back-up. In order to differentiate these two manifold pressure sensors 5, the one for main control is referred to as a first manifold pressure sensor and the one for back-up is referred to as a second manifold sensor.

A throttle body 6 is provided on an upstream side of the manifold pressure sensors 5, and a throttle valve 7 is assembled in the throttle body 6. The throttle valve 7 is driven by a motor 8. The throttle body 6 is provided with a throttle sensor 6A for detecting a throttle opening. Known sensors required for controlling the engine 1 such as an atmospheric pressure senor 9, a cam pulser 10, a crank pulser 11, a cooling water temperature sensor 12, an air temperature sensor 13, etc. are further provided for controlling the engine 1.

An electronic control unit (ECU) 14 performs fuel injection or ignition control according to a program upon reception of output signals from the respective sensors described above. The ECU 14 includes a failure diagnostic function for the manifold pressure sensors 5.

Figure 3:
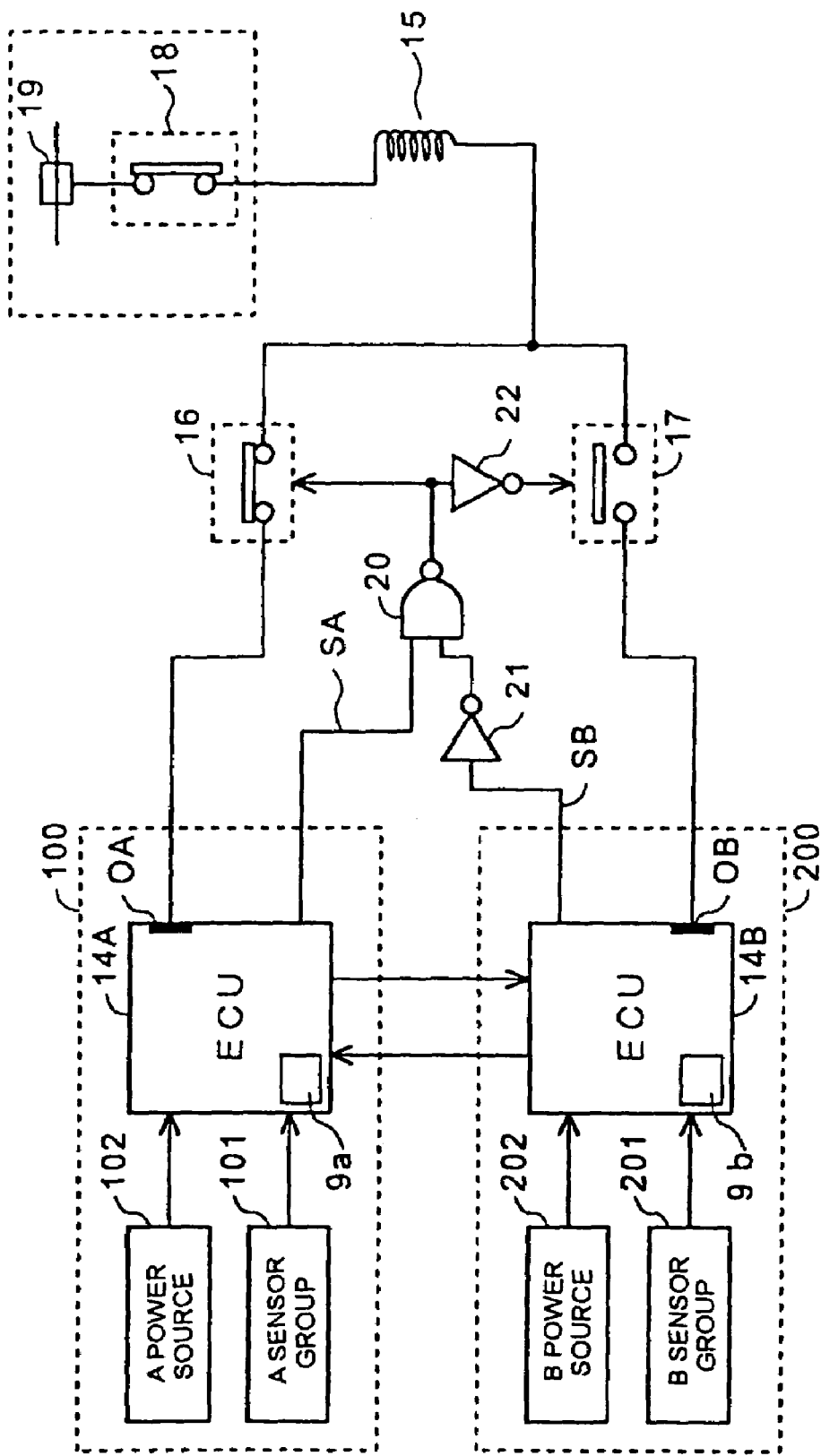
FIG. 3 is a block diagram showing a principal portion of the engine control system including the diagnostic apparatus according to the embodiment of the present invention.

FIG. 3 is a block diagram showing a general structure of the engine control system described above. As shown in FIG. 3, the control system of this embodiment is provided with two detection circuits for the sensors and the ECUs 14 as a failsafe. These systems are referred to as A lane 100 and B lane 200, respectively. The A lane 100 includes an A sensor group 101 including the sensors described in conjunction with FIG. 2, an A power source 102, and an ECU 14A for the A lane. Likewise, the B lane 200 includes a B sensor group 201 including the sensors described in conjunction with FIG. 2, a B power source 202, and an ECU 14B for the B lane. The first manifold pressure sensor is included in the A sensor group 101, and the second manifold pressure sensor is included in the B sensor group 201. Although the atmospheric pressure sensors 9 (9a and 9b) are provided on a circuit board which constitutes the ECU 14A and the ECU 14B or in the housings (not shown) of the ECUs 14A and 14B in this embodiment, the installation positions of the atmospheric pressure sensors 9 are not limited thereto.

The ECUs 14A and 14B are capable of communicating with each other via communication interfaces, not shown. One end (minus side) of each drive coil 15 of the fuel injection value 4 which is provided for each cylinder (only one is shown) is connected to injection signal output terminals OA and OB of the ECUs 14A and 14B, respectively via change-over switches 16, 17. The other end (plus side) of the drive coil 15 is connected to a power source 19, which outputs, for example, a voltage of 14 volts via a power switch 18. The power switch 18 is provided with a current control function. The power sources 19 and the power switches 18 are provided in the ECUs 14A and 14B, respectively.

A switching signal SA outputted from the ECU 14A is connected to an input side of an NAND circuit 20 on one side, and a switching signal SB outputted from the ECU 14B on an input side of the NAND circuit 20 on the other side via a NOT circuit 21. An output from the NAND circuit 20 is supplied to the change-over switch 16 and also to the change-over switch 17 via another NOT circuit 22.

Power is distributed from the power source 19 to the drive coil 15 depending on the condition of the injection signal output terminal of the lane which is connected to one of the change-over switches 16, 17 selected by the switching signals SA and SB. The valve-open duration of the fuel injection valve 4, that is, the amount of fuel injection is determined by the duration of this power distribution.

Figure 4:
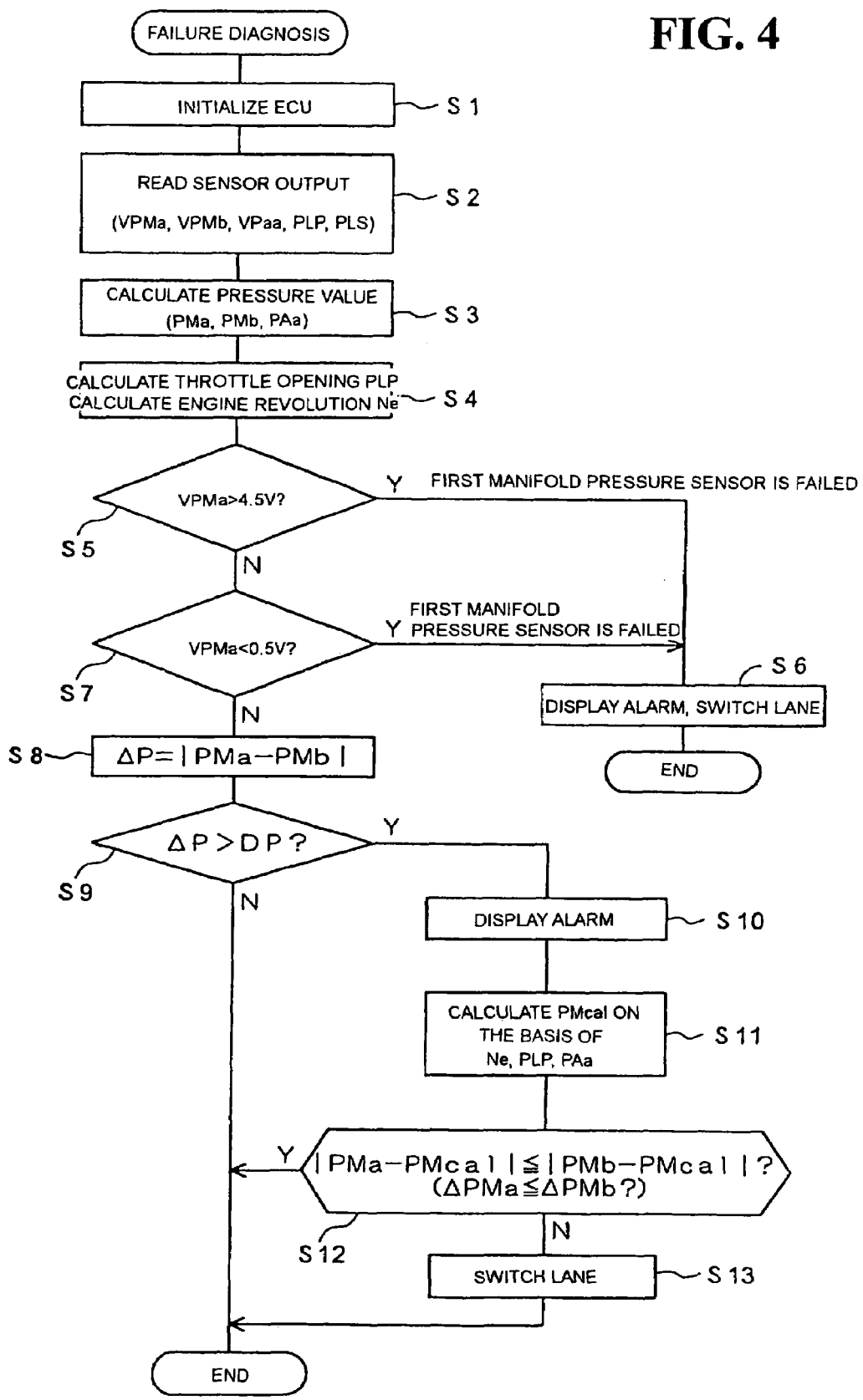
FIG. 4 is a flowchart showing a process of the principal portion of the diagnostic apparatus according to the embodiment of the present invention.

Subsequently, a failure diagnostic function of the first and second manifold pressure sensors 5 will be described. In this embodiment, the A lane 100 is for main control and the B lane 200 serves as a backup. FIG. 4 is a flowchart of a failure diagnostic processing of the manifold pressure sensors. In step S1, the ECUs 14A and 14B are initialized. In Step S2, an output voltage VPma of the first manifold pressure sensor of the A lane 100, an output voltage VPmb of the second manifold pressure sensor of the B lane 200, an output voltage VPaa of the atmospheric pressure sensor 9a of the A lane 100, an output PLP of the throttle sensor 6A, and a crank pulse PLS outputted from the crank pulser 11 of the A lane 100 are read.

In Step S3, physical values PMa, PMb, and PAa (unit: mmHg) of the pressure are calculated on the basis of the output voltages VPma, VPmb, and VPaa. For example, the output voltages are converted to physical values using a prepared conversion table. In step S4, an output of the throttle sensor 6A is read and a throttle opening PLP is calculated, and the engine revolution Ne (rpm) is calculated on the basis of the crank pulse PLS. The engine revolution Ne can be calculated from intervals of the crank pulse PLS.

In Step S5, whether or not the voltage VPma exceeds a predetermined upper limit value (4.5 volts in this case) is determined. If the result of determination is affirmative, it is determined that the first manifold pressure sensor has failed due to a short circuit or the like. Therefore, the procedure goes to Step S6, where an alarm is displayed or the process is switched from the A lane 100 to the B lane 200 in response to the determined abnormality. When the result of Step S5 is negative, the procedure goes to Step S7.

In Step S7, whether or not the voltage VPma is smaller than a predetermined lower limit (0.5 volts for example) is determined. When the result of this determination is affirmative, it is determined that the first manifold pressure sensor has failed due to a disconnection or the like. Therefore, the procedure goes to Step S6 and the process against abnormality is performed. With regard to the alarm display in Step S6, for example, a system fail alarm lamp can be illuminated to inform the pilot that there "no problem for continued flight, but early inspection and reparation are necessary."

When the determination in Step S7 is negative, it is determined that there is no failure such as a short circuit or disconnection in the first manifold pressure sensor. However, if the output voltage VPma falls within the range defined by the upper limit value and the lower limit value, it is possible that a normal pressure value is not outputted, even though there is a functional abnormality that has occurred in the first manifold pressures sensor due to deterioration or the like. Therefore, a functional abnormality due to deterioration cannot be determined by the process in Steps S5 and S7.

Therefore, whether or not there is any deterioration in the first manifold pressure sensor can be determined by the following process. With regard to the engine 1, it is known that an atmospheric pressure PA in an engine operating environment, the engine revolution Ne, and the throttle opening PLP, and the manifold pressure PMa have a certain relation. Therefore, it is understood that using this relation, the manifold pressure can be estimated from the engine revolution Ne, the throttle opening PLP, and the atmospheric pressure PA by a simple calculation. Hereinafter, the manifold pressure obtained by a calculation is referred to as an estimated manifold pressure PMcal. The relations among the atmospheric pressure PA, the engine revolution Ne, the throttle opening PLP, and the manifold pressure PMa are obtained experimentally in advance, and the relations are stored in a storing unit in the ECU 14, so that the estimated manifold pressure PMcal can be calculated easily on the basis of the engine revolution Ne, the throttle opening PLP and the atmospheric pressure PA in reference to these data.

In Step S8, a difference $\Delta P$ between the manifold pressures PMa and PMb is calculated. The difference $\Delta P$ is obtained as an absolute value. In Step S9, whether or not the difference $\Delta P$ is larger than a threshold value DP is determined. The threshold value DP is 44.8 mmHg, for example. Since it seems unlikely that the first and second manifold pressure sensors are deteriorated to the same extent at the same time, when the difference $\Delta P$ is smaller than the threshold value DP, it is determined that the first and second manifold pressure sensors are operating normally, and hence a normal control loop is continued.

When the difference $\Delta P$ is larger than the threshold value DP, it is determined that one or both of the first and second manifold pressure sensors are functionally abnormal. The procedure goes to Step S10, where the alarm display for notifying an abnormality is executed. In this case, a service request lamp, which gives a different instruction from the system fail alarm lamp, is illuminated to indicate that "if it is before takeoff, stop takeoff operation, and if after takeoff, discontinue the flight for inspection and reparation".

Then, in the following process, one of the first and second manifold pressure sensors is identified as a failed sensor by using the relations among the atmospheric pressure PA, the engine revolution Ne, the throttle opening PLP, and the manifold pressure PMa. In Step S11, the estimated manifold pressure PMcal is calculated on the basis of the engine revolution Ne, the throttle opening PLP and the atmospheric pressure PA. The relations among the atmospheric pressure PA, the engine revolution Ne, the throttle opening PLP, and the manifold pressure PMa used for obtaining the estimated manifold pressure PMcal will be described later in detail.

In Step S12, an absolute value ΔPMa of the difference between the manifold pressure PMa detected by the first manifold pressure sensor and the estimated manifold pressure PMcal and an absolute value ΔPMb of the difference between the manifold pressure PMb detected by the second manifold pressure sensor and the estimated manifold pressure PMcal are compared.

When the result of determination in Step S12 is negative, it is determined that an abnormality such as a deterioration has occurred in the first manifold pressure sensor. Therefore, the procedure goes to Step S13 to switch the lane, and the output of the B lane 200 is employed for controlling the engine. In this case as well, it is recommended to illuminate the system fail alarm lamp.

When the determination in Step S12 is affirmative, it is determined that an abnormality such as a deterioration has occurred in the second manifold pressure sensor. In this case, since the abnormality has not occurred in a normal control lane, that is, the A lane 100 which is a main body of control, control by the A lane 100 as the normal control lane is continued.

Figure 5:
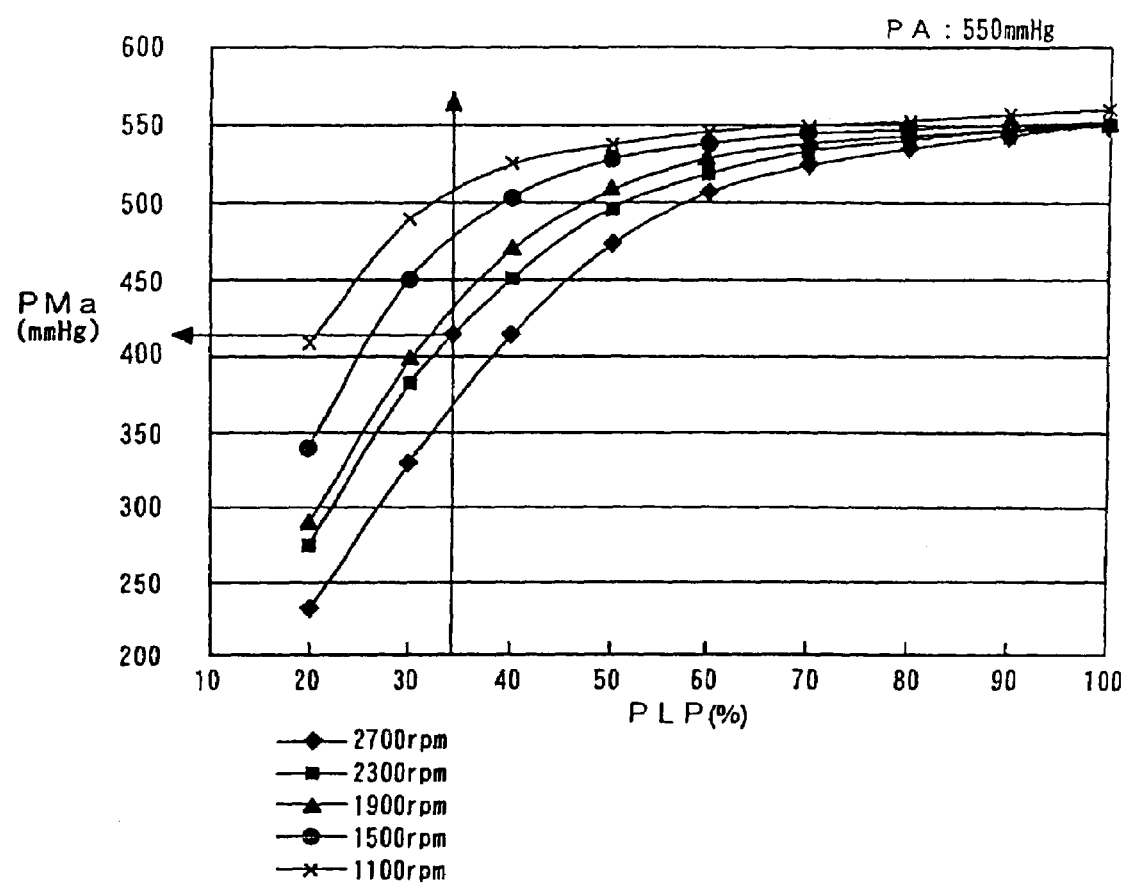
FIG. 5 is a drawing showing an example of a data table used in the calculation of an estimated manifold pressure.

FIG. 5 is a data table showing the relations among the engine revolution Ne, the atmospheric pressure PA, the manifold pressure PMa, and the throttle opening PLP. The data is obtained when the atmospheric pressure PA is set to 550 mmHg in a test apparatus in which the atmospheric pressure PA can be set to various values, and the engine 1 is operated at various numbers of revolutions Ne. The vertical axis represents the manifold pressure PMa, and the lateral axis represents the throttle opening PLP. An atmospheric pressure PA of 550 mmHg, which is obtained when an airplane having the engine 1 mounted thereon is cruising at a height of 8000 feet in the air, is assumed to be a representative atmospheric pressure.

Using the data shown in FIG. 5, the manifold pressure PMa when the engine revolution Ne is 2300 rpm, and the throttle opening PLP is 35% is obtained. In FIG. 5, when an intersection between a line of 35% in the throttle opening PLP (vertical line) and a curved line representing 2300 rpm in the engine revolution Ne is represented as point X, the manifold pressure PMa at the intersection X can be read. In other words, the estimated manifold pressure PMcal can be obtained. The estimated manifold pressure PMcal obtained here is 420 mmHg.

The data shown in FIG. 5 is stored in the memory unit in the ECUs 14A, 14B, and the estimated manifold pressure PMcal can be calculated by performing a functional calculation or a linear interpolation.

Figure 6:
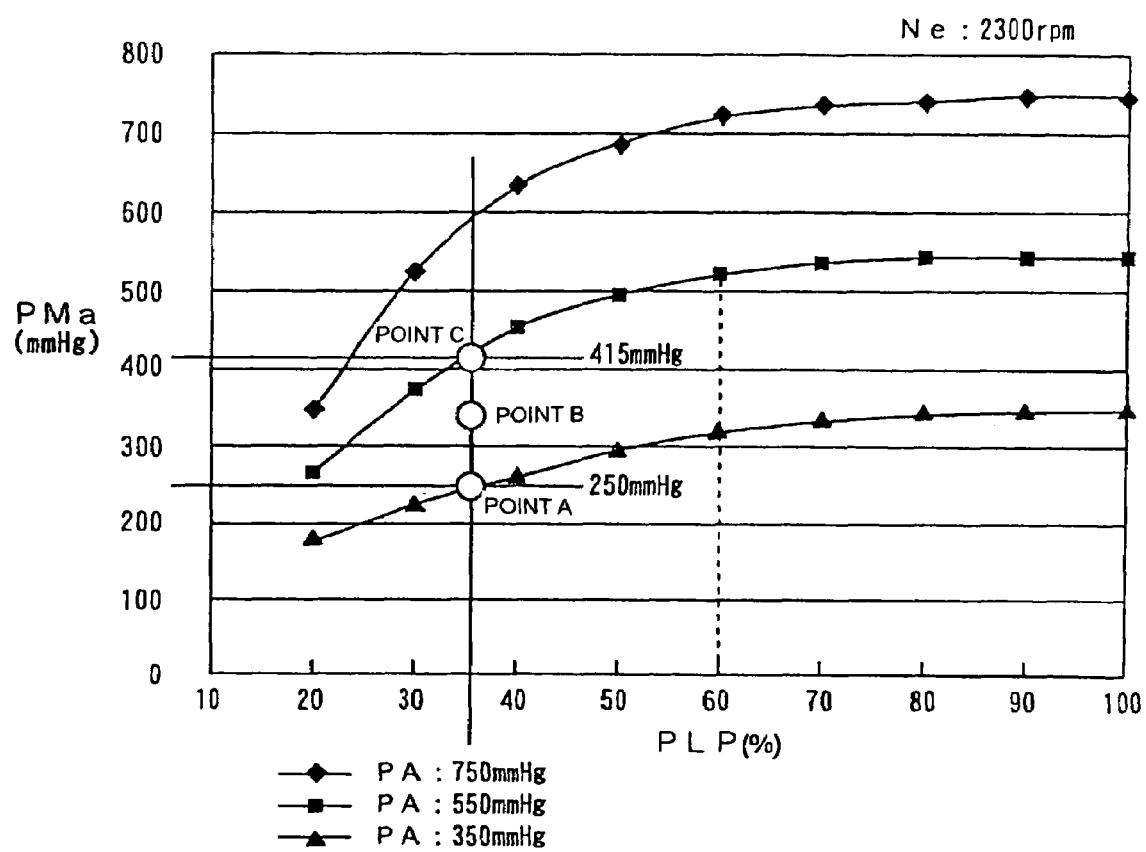
FIG. 6 is a drawing showing another example of the data table used in the calculation of the estimated manifold pressure.

FIG. 6 is a drawing showing a relation between the manifold pressure PMa at various atmospheric pressures (750 mmHg, 550 mmHg, 350 mmHg), and the throttle opening PLP when the engine revolution Ne is 2300 rpm.

A procedure without using the representative atmospheric pressure, but using data in a characteristic curve as in FIG. 6 for obtaining the estimated manifold pressure PMcal at an intermediate atmospheric pressure, which is not on the characteristic curve, will be described. For example, assuming a flight at a height of 9500 feet, an example in which the atmospheric pressure PA is 520 mmHg, the engine revolution Ne is 2300 rpm, and the throttle opening PLP is 35% will be described. First, intersections between a line (vertical line) showing 35% in the throttle opening PLP and the characteristic lines of 350 mmHg and 550 mmHg in the atmospheric pressure PA are represented as point A and point C respectively. An intersection B between the virtual characteristic curve of 520 mmHg in the atmospheric pressure and the line of 35% in the throttle opening PLP is supposed to be at a midpoint between the point A and point C.

The manifold pressure PMa indicated by the point B can be obtained by interpolating on the basis of the coordinates of the point A, the point B, and the point C. In other words, the coordinates of the respective points A, B, C (PLP, PMa, PA) are A (35, 250, 350), B (35, PMa, 520), and C (35, 415, 550), and the manifold pressure PMa is calculated by the following expression.

$$PMa = 250 + (415-250)/(550-350) \times (520-350)$$

According to this expression, the manifold pressure PMa is obtained as 390 mmHg, that is, the estimated manifold pressure PMcal is obtained as 390 mmHg.

For example, by creating the data tables as shown in FIG. 6, for example, in increments of 500 rpm from 500 rpm to the upper limit of usage 3000 rpm and storing these tables in the ECUs 14A and 14B, the estimated manifold pressures PMcal according to various numbers of engine revolution can be calculated.

Figure 1:
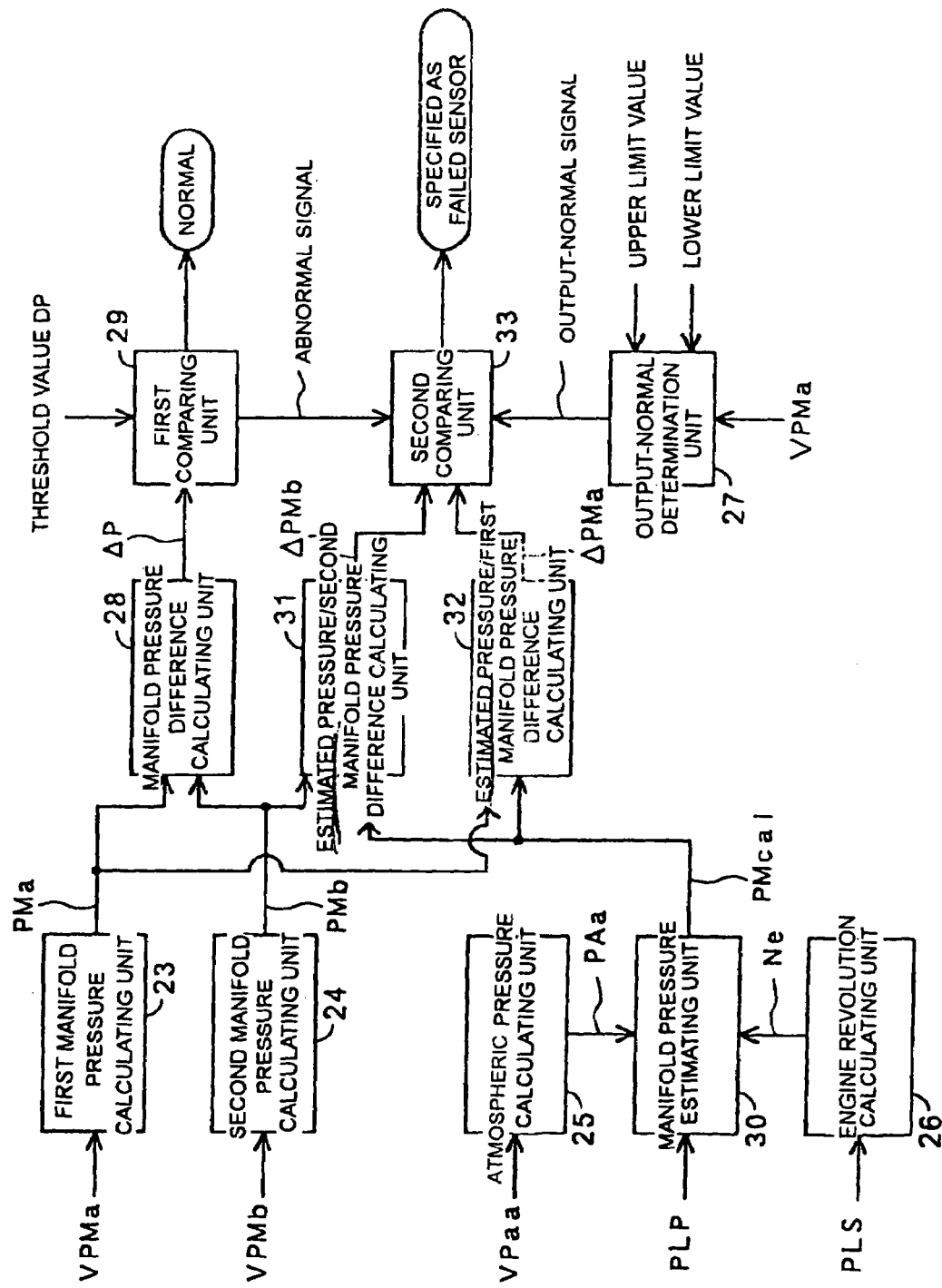
FIG. 1 is a block diagram showing a function of a principal portion of a diagnostic apparatus according to an embodiment of the present invention.

FIG. 1 is a block diagram showing a function of the principal portion of the ECU 14A, which performs the processing described in conjunction with the flowchart in FIG. 4. A first manifold pressure calculating unit 23 calculates the manifold pressure PMa on the basis of values VPMa detected by the first manifold pressure sensor. A second manifold pressure calculating unit 24 calculates the manifold pressure PMb on the basis of values VPMb detected by the second manifold pressure sensor. An atmospheric pressure calculating unit 25 calculates the atmospheric pressure PAa on the basis of values VPaa detected by the atmospheric pressure sensor 9a. The engine revolution calculating unit 26 calculates the engine revolution Ne on the basis of the crank pulse PLS.

An output-normal determination unit 27 determines whether or not the value VPMa detected by the first manifold pressure sensor 5A exists in the predetermined range, that is, between the upper limit value and the lower limit value. If the detected value VPMa is within the predetermined range, an output-normal signal is supplied.

A manifold pressure difference calculating unit 28 calculates the difference ΔP between the manifold pressure PMa and the manifold pressure PMb. A first comparing unit 29 compares the difference ΔP and the threshold value DP, and when the difference ΔP is smaller, outputs a normal signal. When the difference ΔP is larger, an abnormal signal is output. The manifold pressure difference calculating unit 28 and the first comparing unit 29 constitute an abnormality recognizing unit.

A manifold pressure estimating unit 30 calculates the estimated manifold pressure PMcal from the engine revolution Ne, the throttle opening PLP, and the atmospheric pressure PAa. For example, the manifold pressure estimating unit 30 utilizes the data table as shown in FIG. 5 or FIG. 6 and estimates the manifold pressure. An estimated pressure/second manifold pressure difference calculating unit 31 calculates the difference ΔPMb between the manifold pressure PMb and the estimated manifold pressure PMcal. An estimated pressure/first manifold pressure difference calculating unit 32 calculates the difference ΔPMa between the manifold pressure PMa and the estimated manifold pressure PMcal. A second comparing unit 33 compares the difference ΔPMa and the difference ΔPMb in response to an input of the abnormal signal from the first comparing unit 29 and the output-normal signal from the output-normal determination unit 27. Depending on which one of the difference ΔPMa and the difference ΔPMb is larger, when the difference ΔPMa is larger, it is determined that the first manifold pressure sensor is abnormal, and when the difference ΔPMb is larger, it is determined that the second manifold pressure sensor is abnormal. The estimated pressure/second manifold pressure difference calculating unit 31, the estimated pressure/first manifold pressure difference calculating unit 32, and the second comparing unit 33 constitute an abnormality identifying unit.

As described above, according to this embodiment, in a system including manifold pressure sensors provided in a plurality of systems, the manifold pressure is estimated from the engine revolution Ne, the throttle opening PLP, and the atmospheric pressure for identifying the manifold pressure sensor that has a function that is lowered due to deterioration or the like. Therefore, the failed manifold sensor can be identified on the basis of the difference between the estimated manifold pressure PMcal and the respective pressures detected by the first and second manifold pressure sensors.

In the embodiment described above, determination of an abnormality and identification of the failed sensor are performed on the basis of the difference between the pressure values detected by the first and second manifold pressure sensors, and between the pressure values detected by the first and second manifold pressure sensors and the estimated manifold pressure value.

However, the invention is not limited thereto. Instead of the difference between the respective pressure values, determination of an abnormality and identification of the failed sensor can be performed on the basis of a ratio value. For example, the manifold pressure difference calculating unit 28 may be replaced by a unit that calculates a ratio value between the pressures PMa and PMb. Then, the first comparing unit 29 is adapted to determine whether both of the first and second manifold pressure sensors are normal, or at least one of them is failed depending on whether the calculated ratio value is within the predetermined range from a predetermined value, that is, "1". For example, when the pressure PMa/PMb is within the range from 0.95 to 1.05, it is determined that both of the first and second manifold pressure sensors are normal, and when it is out of the range, it is determined that at least one of the first and second manifold pressure sensors is abnormal.

In the same manner, the estimated pressure/second manifold pressure difference calculating unit 31 is replaced by a unit that calculates the ratio value between the detected manifold pressure PMa and the estimated manifold pressure PMcal, and the estimated pressure/first manifold pressure difference calculating unit 32 is replaced by a unit that calculates the ratio value between the detected manifold pressure PMb and the estimated manifold pressure PMcal. Then, the second comparing unit 33 is adapted to specify that the manifold pressure sensor corresponding to the pressure value which corresponds to the sensor whose calculated ratio value is deviated more from the predetermined value, that is, "1" is a sensor having an abnormality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A failure diagnostic method for manifold pressure sensors used in an engine control system having a first manifold pressure sensor that performs main control, a second manifold pressure sensor that backs up the first manifold pressure sensor, an atmospheric pressure sensor, an engine revolution detector, and a throttle sensor, said method comprising the steps of:
   calculating an estimated manifold pressure on the basis of engine revolution, a throttle opening, and an atmospheric pressure value;
   determining that a failure has occurred when a difference between an output from the first manifold pressure sensor and an output from the second manifold pressure sensor exceeds a predetermined range; and
   identifying which one of the first and second manifold pressure sensors has failed by determining which of the first and second manifold pressure sensors has a larger difference between the output and the estimated manifold pressure.

2. The failure diagnostic method for manifold pressure sensors according to claim 1, wherein the step of determining that a failure has occurred further comprises the step of using absolute values of the differences.

3. The failure diagnostic method for manifold pressure sensors according to claim 1, wherein the step of calculating the estimated manifold pressure is performed by a functional calculation or a linear interpolation.

4. The failure diagnostic method for manifold pressure sensors according to claim 1, further comprising the step of calculating the physical values of the outputs of the first and second manifold pressure sensors from the output voltages of the first and second manifold pressure sensors.

5. The failure diagnostic method for manifold pressure sensors according to claim 4, further comprising the step of determining that a failure has occurred if the voltages of the first and second manifold pressure sensors are above a predetermined upper limit or below a predetermined lower limit.

6. The failure diagnostic method for manifold pressure sensors according to claim 4, wherein the step of calculating the physical values of the outputs of the first and second manifold pressure sensors from the output voltages of the first and second manifold pressure sensors further comprises the step of using a conversion table.

7. A failure diagnostic apparatus for manifold pressure sensors used in an engine control system having a first manifold pressure sensor that performs main control, a second manifold pressure sensor that backs up the first manifold pressure sensor, an atmospheric pressure sensor, an engine revolution detector, and a throttle sensor, comprising:
   an abnormality recognizing unit that outputs an abnormal signal when a difference between a first detected manifold pressure value detected by the first manifold pressure sensor and a second detected manifold pressure value detected by the second manifold pressure sensor exceeds a threshold value;
   a manifold pressure estimating unit that outputs an estimated manifold pressure value in response to input of the engine revolution, a throttle opening, and an atmospheric pressure value according to a predetermined mutual relation among the engine revolution, the throttle opening, a manifold pressure, and an atmospheric pressure; and
   an abnormality identifying unit that calculates a difference between the first and second detected manifold pressure values and the estimated manifold pressure value, respectively, and identifies the manifold pressure sensor which detects a larger manifold pressure value difference as a failed sensor, wherein identification of the failed sensor by the abnormality identifying unit is performed in response to an output of the abnormal signal from abnormality recognizing unit.

8. The failure diagnostic apparatus for manifold pressure sensors according to claim 7, wherein the determinations of the differences by the abnormality recognizing unit and the abnormality identifying unit are performed using absolute values of the differences.

9. The failure diagnostic apparatus for manifold pressure sensors according to claim 7, wherein the manifold pressure estimating unit calculates the estimated manifold pressure by a functional calculation or a linear interpolation.

10. The failure diagnostic apparatus for manifold pressure sensors according to claim 7, wherein the abnormality recognizing unit calculates physical values of the first and second manifold pressure sensors from output voltages of the first and second manifold pressure sensors.

11. The failure diagnostic apparatus for manifold pressure sensors according to claim 10, wherein the abnormality recognizing unit determines that a failure has occurred if the voltages of the first and second manifold pressure sensors are above a predetermined upper limit or below a predetermined lower limit.

12. The failure diagnostic apparatus for manifold pressure sensors according to claim 10, wherein the abnormality recognizing unit calculates the physical values of the first and second manifold pressure sensors from the output voltages of the first and second manifold pressure sensors by using a conversion table.

13. A failure diagnostic apparatus for manifold pressure sensors used in an engine control system having a first manifold pressure sensor that performs main control, a second manifold pressure sensor that backs up the first manifold pressure sensor, an atmospheric pressure sensor, an engine revolution detector, and a throttle sensor, comprising:

abnormality recognizing unit that outputs an abnormal signal when a ratio value between a first detected manifold pressure value detected by the first manifold pressure sensor and a second detected manifold pressure value detected by the second manifold pressure sensor is deviated from a threshold value;

a manifold pressure estimating unit that outputs an estimated manifold pressure value in response to input of the engine revolution, a throttle opening, and an atmospheric pressure value according to a predetermined mutual relation among the engine revolution, the throttle opening, a manifold pressure, and the atmospheric pressure; and an abnormality identifying unit that calculates a ratio value between the estimated manifold pressure value and the first detected manifold pressure value, and a ratio value between the exterminated manifold pressure value and the second detected manifold pressure value and identifies the manifold pressure sensor which detected the manifold pressure value corresponding to the calculated ratio value which is deviated more from a predetermined value as a failed sensor, wherein identification of the failed sensor by the abnormality identifying unit is performed in response to an output of the abnormal signal.

14. The failure diagnostic apparatus for manifold pressure sensors according to claim 13, wherein the manifold pressure estimating unit calculates the estimated manifold pressure by a functional calculation or a linear interpolation.

15. The failure diagnostic apparatus for manifold pressure sensors according to claim 13, wherein the abnormality recognizing unit calculates physical values of the first and second manifold pressure sensors from output voltages of the first and second manifold pressure sensors.

16. The failure diagnostic apparatus for manifold pressure sensors according to claim 15, wherein the abnormality recognizing unit determines that a failure has occurred if the voltages of the first and second manifold pressure sensors are above a predetermined upper limit or below a predetermined lower limit.

17. The failure diagnostic apparatus for manifold pressure sensors according to claim 15, wherein the abnormality recognizing unit calculates the physical values of the first and second manifold pressure sensors from the output voltages of the first and second manifold pressure sensors by using a conversion table.

* * * * *